United States Patent [19]

Stein

[11] 3,816,768

[45] June 11, 1974

[54] MEMORY PROTECTING CIRCUIT

[75] Inventor: Jeffrey P. Stein, Devon, Pa.

[73] Assignee: Honeywell Inc., Minneapolis, Minn.

[22] Filed: Aug. 16, 1972

[21] Appl. No.: 281,222

[52] U.S. Cl. ...................... 307/296, 307/23, 307/64, 328/258

[51] Int. Cl. ............................................ H03k 1/02

[58] Field of Search ............... 307/23, 64, 238, 296; 328/259, 264, 258

[56] References Cited

UNITED STATES PATENTS 3,249,769 5/1966 Mierendorf ...................... 307/64 X

*Primary Examiner*—John Zazworsky
*Attorney, Agent, or Firm*—Arthur H. Swanson; Lockwood D. Burton; Mitchell J. Halista

[57] ABSTRACT

A circuit for automatically connecting a temporary source of power to a memory system during failure of a primary power source for the memory system to provide low duty cycle current pulses to the memory system.

6 Claims, 2 Drawing Figures

MEMORY PROTECTING CIRCUIT

The present invention relates to computer memories. More specifically, the present invention is directed to a protecting circuit for a computer memory using active bistable storage devices to prevent loss of information from the computer memory during a failure of the primary power supply for the computer memory.

An object of the present invention is to provide an improved computer memory protecting circuit for supplying power to a computer memory using active bistable devices during the failure of a primary power source for the computer memory.

SUMMARY OF THE INVENTION

In accomplishing this and other objects, there have been provided, in accordance with the present invention, a memory protecting circuit which is arranged to provide a continuing supply of power to the bistable active devices in the computer memory which is effective to maintain a quiescent state of the active devices to save the memory contents.

BRIEF DESCRIPTION OF THE DRAWINGS

A better understanding of the present invention may be had when the following detailed description is read in connection with the accompanying drawings in which.

DETAILED DESCRIPTION

Figure 1:
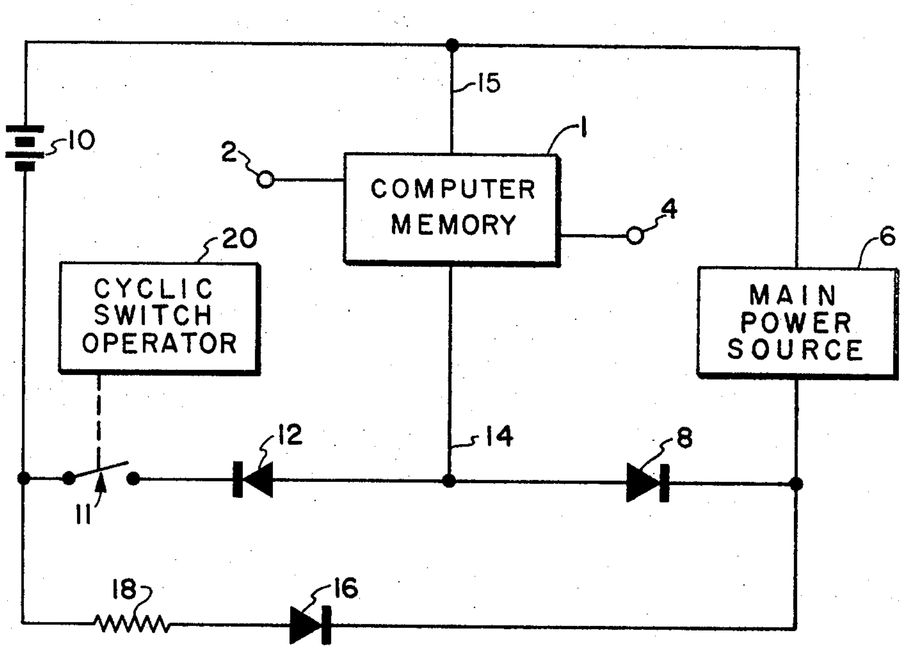
FIG. 1 is a block diagram of a computer memory system embodying the present invention.

Referring to FIG. 1 in more detail, there is shown a block diagram of a computer memory system embodying the present invention. A computer memory 1, which may be any suitable active device type using bistable cells, e.g., bipolar transistor, MOS, etc, is arranged in a conventional configuration for receiving input information for storage in predetermined memory locations and feeding out stored information from the storage locations. An input terminal 2, is arranged to supply input information to be stored in the computer memory 1 while an output terminal 4 is arranged to receive information from the computer memory 1 for application to associated devices, e.g., storage registers.

A primary, or main, power source 6 is arranged to supply power to the power input terminals of the computer memory through a first isolation diode 8. A secondary, or backup, power source such as a battery 10 is provided as a source of power to the computer memory 1 during a time of failure of the main power source 6. Specifically, one terminal of the secondary power source 10 is connected to one of the power input terminals of the computer memory through a serial combination of a switch 11 and a second isolation diode 12 to a common junction on a first computer power input line 14 with the first isolation diode 8. A second power input line 15 for the memory 1 is connected directly to the other side of the source 6 and the battery 10. It should be noted that the battery 10 and source 6 have similar polarity terminals connected to corresponding power input lines 14 and 15 to maintain the polarity of the power supplied to the memory 1. A battery recharging circuit consisting of a series connection of a third isolating diode 16 and a current limiting resistor 18 is connected between the main power source 6 and the secondary power source as represented by the battery 10. A cyclic switch operator 20 is arranged to operate the switch means 11 to intermittently connect the secondary source 10 to the computer memory 1 as hereinafter discussed.

MODE OF OPERATION

In operation, the memory protect circuit of the present invention utilizes two interrelated techniques to provide memory retention capability for the memory 1. First, the static memory cell is operated in a pulsed power mode during failure of the main source 6 in order to provide memory retention while draining an extremely small amount of power from the secondary power source. Secondly, the secondary power source is connected across the main power source whereby the main power source automatically changes the secondary source while being isolated therefrom upon failure of the main power source 6. The recharging circuit is provided to enable the main power source 6 to keep the secondary power source 10 fully charged in anticipation of a failure of the main power source 6. During normal operation, the main power source 6 supplies current through the first isolation diode 8 to the computer memory 1 as well as to any other circuit elements relying on the main power source 6 for their power supply. One of these secondary loads is the charging path for the battery 10 through the third isolation diode 16 and the current limiting resistor 18. The voltage of the main power source 6 is arranged to be slightly greater than the voltage of the secondary power source 10, and, thus, the second isolation diode 12 prevents a current drain from the secondary power source 10 during normal operation of the main power source 6. On the other hand, the charging path for the secondary power source 10 is arranged to conduct current from the main power source 6 to charge the battery 10 if required. When the main power source 6 fails or a transient fault of the main power source 6 is effective to reduce the voltage supplied by the main power source 6 below the level of the voltage of the secondary power source 10, the secondary power source 10 supplies current to the computer memory 1 through the switch means 11 and the second isolation diode 12 to maintain the stored contents of the memory 1.

The cyclic switch operator 20 is arranged to periodically actuate third switch 11 to reduce the current drain from the battery 1 by producing a low duty cycle current pulse which is only required to maintain the active devices in the computer memory 1 in their memory retentive state. Further, the secondary power source 10 is cut off from the main power source 6 by the now back-biased first and hird diode 8, 16 to insure that the only current drawn from the secondary power source 10 is used to power the computer memory and not any other loads connected to the main power source 6. It should be noted that the switch means 11 and the cyclic switch operator 20 may be replaced by a low-duty cycle oscillator energized by the battery 10 and arranged to provide low-duty cycle current pulses to the computer memory for maintaining the memory cells in a retentive state. In this configuration, the battery charging circuit shown in FIG. 1 would be retained to provide a battery charging operation for the battery 10 used to supply the oscillator during the failure time of the main power source 6.

Figure 2:
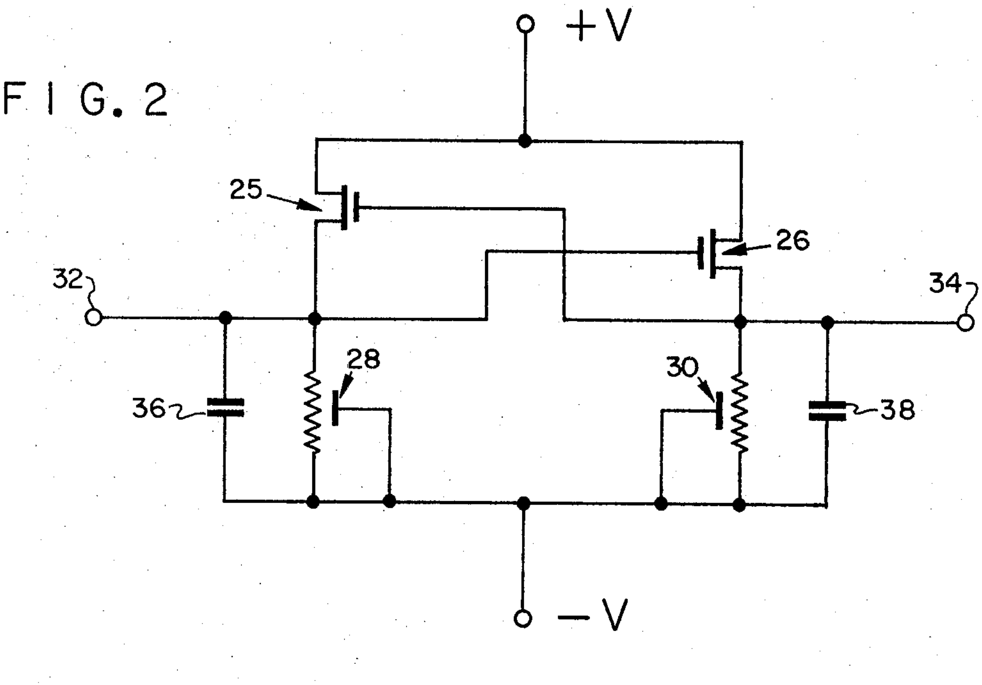
FIG. 2 is a schematic diagram of a bistable active device memory cell used in the memory system shown in FIG. 1.

In FIG. 2 there is shown a schematic illustration of a bistable active device used as a memory cell in the memory 1 shown in FIG. 1. The basic configuration is that of a flip-flop circuit having a pair of field-effect transistors 25 and 26, hereinafter referred to as FET 25 and 26. The load resistors for the FET's 25 and 26 are formed from separate field effect transistors 28 and 30 respectively, to provide an easily integratable circuit array. In the illustrated embodiment, the load resistors 28 and 30 are connected as current sources for purposes of illustrating a suitable configuration. A pair of terminals 32 and 34 are provided for setting the flip-flop circuit and for sensing the state of the flip-flop circuit. Specifically, terminal 32 is connected to the junction between the first FET 25 and the associated load resistor 28 while terminal 34 is connected to the junction between the second FET 26 and the associated load resistor 30. Thus, in normal operation, either the signal level on terminal 32 or 34 is low and the other high to denote the storage of a particular bit of binary information. For example, if the terminal 32 is high, the normal parasitic junction capacitances of the FET devices are shown as capacitors 36, 38 connected between the terminals 32 and 34, respectively, and a source of negative energizing potential −V. Thus, a first capacitor 36 is connected between the terminal 32 and the source −V while a second capacitor 38 is connected between the second input terminal 34 and the source −V.

In the aforesaid exemplary state wherein the terminal 32 at a high signal level, the first FET 25 is in a current conducting state, and the first capacitor 36 is charged to a voltage level representative of the difference between a source of positive potential +V supplying power to the flip-flop circuit and the source of negative potential −V. If the power supply used to energize the sources +V and −V is interrupted for any reason, the capacitors 36 and 38 must discharge through the very high impedance of the cut-off, i.e., non-conducting, FET devices. This discharge process takes a relatively long time because of the large time constant, and, since only one of the capacitors is substantially charged, it takes much longer for that capacitor to lose its stored charge than the other. Thus the memory cell has a "weighted" side so that if the input power from a temporary or secondary source to the power terminals supplying the +V and −V is provided before the capacitors 36 and 38 equalize in voltage, the flip-flop or memory cell will assume the previous bit storage state to maintain the stored information and "refresh" the capacitor charge for the next cycle of power-off time. Accordingly, the secondary power supply can be operated to provide current pulses and, if repeated at a required frequency and duty cycle, can maintain the information in the memory cell with a very low power consumption from the source of temporary of secondary power. A typical example for the low duty cycle that can be used to maintain the illustrated memory cell is approximately 0.1 percent. Thus, the switch operator 20 shown in FIG. 1 is effective to reduce the drain from the secondary power source 10 to an extremely low level which enables the secondary source 10 to maintain the contents of the computer memory 1 for a very long period of time as compared with a continuously operating secondary power source having the same power supply capabilities.

Accordingly, it may be seen that there has been provided, in accordance with the present invention, a computer memory protecting circuit for supplying power to a memory system during failure of a primary power source to retain the contents of the memory system.

The embodiments of the invention in which an exclusive property of privilege is claimed are defined as follows:

1. A circuit comprising:

first means for supplying electrical power having a predetermined amplitude and duration, said means including a first direct current power supply means, a switch means and cyclic switch operating means for operating said switch means at a predetermined frequency, a pair of output terminals, first diode means, circuit means connecting said first-mentioned means and said diode means in series across said output terminal means to form a circuit for supplying electrical power to said output terminal means, a second direct current power supply means, a second diode means and, second circuit means arranged to connect said second diode means and said second direct current power supply means in series across said output terminals with said second diode means being poled to prevent discharge of said first-mentioned means through said second supply means and said first diode means being poled to prevent discharge of said second supply means through first-mentioned means, said predetermined frequency of said cyclic switch operating means being arranged to provide an intermittent application of direct current power from said first-mentioned means to said output terminals during the duration of a loss of direct current power from said second supply means.

2. A circuit as set forth in claim 1 wherein said first direct current power supply means is a battery.

3. A circuit as set forth in claim 1 wherein said second direction current power supply means is a battery.

4. A circuit as set forth in claim 2 and including a battery recharging circuit connected between said battery and said second direct current power supply means.

5. A circuit as set forth in claim 4 wherein said recharging circuit includes a diode means poled to prevent discharge of said battery by said second-mentioned power supply means.

6. A circuit as set forth in claim 2 wherein said second mentioned direct current power supply means is a battery.

* * * * *